(12) United States Patent
Kinstler

(10) Patent No.: US 6,441,936 B1
(45) Date of Patent: *Aug. 27, 2002

(54) WIRELESS DATALINK ACTIVATION SYSTEM HAVING POWER CONDITIONING CAPABILITIES

(75) Inventor: Gary A. Kinstler, Torrance, CA (US)

(73) Assignee: The Boeing Company, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/221,218

(22) Filed: Dec. 23, 1998

Related U.S. Application Data

(63) Continuation-in-part of application No. 08/801,075, filed on Feb. 14, 1997, now Pat. No. 5,933,263.

(51) Int. Cl.$^7$ .......................... H04B 10/10; H04B 10/26
(52) U.S. Cl. ...................... 359/142; 359/145; 359/168; 359/171
(58) Field of Search ................................ 359/142, 144, 359/145, 146, 147, 168, 171

(56) References Cited

U.S. PATENT DOCUMENTS

| | | | |
|---|---|---|---|
| 3,228,337 A | 1/1966 | Grantham et al. | 102/70.2 |
| 4,091,734 A | 5/1978 | Redmond et al. | 102/70.2 |
| 4,479,264 A | 10/1984 | Lockett et al. | 455/605 |
| 4,697,764 A | 10/1987 | Hardy et al. | 244/137.4 |
| 4,870,902 A | 10/1989 | Simon et al. | 102/201 |
| 4,879,760 A * | 11/1989 | Kroll et al. | 359/171 |
| 4,897,884 A | 1/1990 | Heller | 455/603 |
| 4,905,309 A | 2/1990 | Maisonneuve et al. | 455/603 |
| 4,912,522 A | 3/1990 | Oates et al. | 455/603 |
| 4,949,397 A * | 8/1990 | Smoot | 359/171 |
| 5,005,211 A | 4/1991 | Yuhasz | 455/603 |
| 5,276,336 A | 1/1994 | Winterhalter | 250/551 |
| 5,382,947 A * | 1/1995 | Thaler et al. | 340/825.22 |
| 5,654,813 A | 8/1997 | Whitworth | 359/147 |
| 5,760,558 A | 6/1998 | Popat | 318/480 |
| 5,933,091 A * | 8/1999 | McCaslin | 340/825.72 |
| 6,055,079 A * | 4/2000 | Hagans et al. | 359/147 |

* cited by examiner

Primary Examiner—Leslie Pascal
(74) Attorney, Agent, or Firm—Lawrence N. Ginsberg

(57) ABSTRACT

The system includes at least one data receiver, a low-power photo-voltaic power generation and distribution system, and a unique signal detector. The data receiver receives serial digital information from a remote optical data transmitter. The data receiver serves both activation and data/control wireless datalink functions. The low-power photo-voltaic power generation and distribution system includes at least one photo-voltaic panel for receiving optical power from a remote optical emission source; and power conditioning, accumulation, and distribution means. Such means includes a digital micro-power timer integrated circuit. The power conditioning, accumulation, and distribution means is connected to the photo-voltaic panel for accumulating power generated by the photo-voltaic panel for periodically and intermittently distributing accumulated power in desired quantities. The unique signal detector is connected to the data receiver and to the power conditioning, accumulation and distribution means, and is connectable to an electrical apparatus. The periodically and intermittently distributed power enables the unique signal detector to evaluate incoming data received from the data receiver, and upon detection of the receipt of a signal qualifying as a key, thereupon issues a command to the electrical apparatus to initiate uninterrupted data communication from the data receiver. The system is capable of providing a lifetime physical-connection-free means of accomplishing remote datalink activation and subsequent communications functions to remote objects.

26 Claims, 2 Drawing Sheets

WIRELESS DATALINK ACTIVATION SYSTEM HAVING POWER CONDITIONING CAPABILITIES

This is a Continuation-In-Part of patent application Ser. No. 08/801,075, now U.S. Pat. No. 5,93,263 filed on Feb. 14, 1997, entitled "SELF-POWERED DATALINK ACTIVATION SYSTEM."

BACKGROUND OF THE INVENTION

1. Field of the Invention

The present invention pertains to a wireless apparatus and method for initiating (activating) communications of a datalink to remote devices without the use of any physically-connected or internal battery power within the remote objects. The invention is especially attractive for situations where it is desirable to activate communications with a remote device over an unlimited period of time without expending any internal energy reserves. The invention is particularly applicable to roving objects with no convenient continuous connection to an external power source (e.g. human beings and animals). It is also particularly useful for an armament system with a plurality of munitions which require pre-conditioning initialization prior to launch, but which have no direct wire umbilical connection to the host platform.

2. Description of the Related Art

Today's data communications receiving systems generally require some form of externally- or internally (battery)-provided power to be utilized to initiate and/or maintain communications coming from a data transmitter. In some cases, that power is manually turned on and off by an operator. In other cases, a continuous source of power is provided by a wire connection to an external power source, or is obtained from an internal battery. In many cases, a wire connection is not feasible or desirable for reasons of continuous external power unavailability (e.g., roving objects such as human being,s or animals), or for reasons of cost. Use of an internal battery for continuous power suffers the disadvantage of limited link activation standby time caused by eventual exhaustion of the limited battery reserve, or the need for periodic battery recharging by such means as high-illumination photo-voltaic arrays.

One class of remote objects which requires a communications channel is that of precision guided munitions (PGM's). Today's PGM's require varying degrees of pre-launch preparation, or initialization, to enable and prepare the PGM's guidance system, and control targeting and launch sequencing. This is generally accomplished with a datalink between the host platform and the munitions, most commonly over a hardwire umbilical between the host platform and the PGM. A hardware connection affords the ability to uniquely and individually communicate between the host platform and each object and to provide a source of power to sustain the communication process.

Recent innovations to reduce the cost of upgrading host platforms to interface with PGM's have resulted in the elimination of the hardwire umbilical to PGM's, using instead a wireless interface and self-contained munitions power. Current implementations of the wireless interface require that the munitions contain a standby power source, viz., a standby battery, to maintain a low-power operational mode of the receive data link as the munitions await for instructions to activate full datalink functionality. Such battery-powered implementations provide a relatively short (on the order of days) period of standby operation before the standby datalink battery needs to be replaced.

The prior art teaches methods to supply power for data link operation. Maisonneuve, et al. in U.S. Pat. No. 4,091,734, disclose employing fiber-optic connections to remotely located electrical apparatus to supply sufficient power for data link operation. Others might use large photo-voltaic optical (sunlight) power collection arrays, to supply sufficient power for data link operation.

U.S. Pat. No. 4,091,734, issued to Redmond, et al. teaches using power from a photo-voltaic cell stimulated by a visible light source to power an optical receiver datalink. Though Redmond's teaching and implementation might be used for a light-activated control function, its range is limited to 20 inches, which is insufficient for remote (i.e., longer range) light activation control applications. Redmond, et al. teach the use of a direct IR carrier modulation which utilizes a modulation of the raw IR energy, i.e., 940 nanometers wavelength, for transmission of single information bits, then relying on a protocol to encode information, in Redmond's case using a pulse numbers protocol. The Redmond, et al. approach can implement ranges only up to 20 inches (1.6 ft). This is not sufficient for some intended virtual umbilical applications (8 ft). It is the intent of the current invention to overcome such restrictive range limitations.

The modulation method employed by Redmond cannot, with any practical scaling or extension, meet many wireless range requirements. In particular, no practical "scaled up" version of Redmond's techniques can feasibly achieve the required wireless range for dispersed munitions in an aircraft environment activation.

Redmond, et al. also teach a power conditioning, or accumulation, function. Redmond, et al., however, continuously applies this power to the power accumulator device (a capacitor) and data recovery circuit. This results in a requirement for a relatively high level of optical illumination to provide sufficient operating power.

To maximize the attractiveness of a wireless datalink to potential roving or stationary unpowered applications, there is clearly a need to remove the need for any power or data path physical connection to such remote devices in order to establish a communications link. Attractiveness is further enhanced by being able to extend the maintenance-free time of the datalink activation system employed and to achieve operation at lower levels of operating power.

OBJECTS AND SUMMARY OF THE INVENTION

It is therefore a principal object of the present invention to provide a datalink activation function of long duration for remote objects which have no physical connection to external power, this long duration being for the lifetime of the remote objects.

It is another object to be able to accomplish the activation function with a relatively low level of illumination at the receiving object(s) and with the use of relatively few light sources, which are remotely located from the object(s), to provide sufficient power to many objects at once, thereby permitting a practical implementation.

It is yet another object to maximize the installation cost benefits and low-maintenance attractiveness of a wireless interface data link to potential PGM customers by removing the need for any power or data path physical connection to remote devices to establish a communications link.

It is still another object to extend the maintenance-free time of the datalink activation system employed.

These and other objects are achieved by the wireless datalink activation system of the present invention. In its broad aspects, the system includes at least one data receiver, a low-power photo-voltaic power generation and distribution system, and a unique signal detector. The data receiver receives serial digital information from a remote optical data transmitter. The data receiver serves both activation and data/control wireless datalink functions. The low-power photo-voltaic power generation and distribution system includes at least one photo-voltaic panel for receiving optical power from a remote optical emission source; and power conditioning, accumulation, and distribution means. Such means includes a digital micro-power timer integrated circuit. The power conditioning, accumulation, and distribution means is connected to the photo-voltaic panel for accumulating power generated by the photo-voltaic panel for periodically and intermittently distributing accumulated power in desired quantities. The unique signal detector is connected to the data receiver and to the power conditioning, accumulation and distribution means, and is connectable to an electrical apparatus. The periodically and intermittently distributed power enables the unique signal detector to evaluate incoming data received from the data receiver, and upon detection of the receipt of a signal qualifying as a key, thereupon issues a command to the electrical apparatus to initiate uninterrupted data communication from the data receiver.

The system is capable of providing a lifetime physical-connection-free means of accomplishing remote datalink activation and subsequent communications functions to remote objects.

Its advantage is that only a low ambient lighting source is sufficient to provide the power necessary to initiate (activate) datalink functions with remote objects. The required power is accumulated. Only when a sufficient amount has been stored, then the stored power is switched to the data receiver. This technique of intermittent switched power application allows the use of a photo-voltaic power source which provides less than the amount of continuous power required for the data recovery function. This technique allows the power to be gathered over an extended period (e.g., 2 seconds), then applied over a relatively short period (e.g., 50 milliseconds). This affords a 40X improvement in available power for the data recovery circuitry, thereby permitting a proportionate reduction in the illumination intensity. Comparable reductions of illumination power and light intensity are possible with this innovation. The present invention affords the possibility of power accumulation and control function operation at more remote (longer) ranges than Redmond's approach, making it applicable in many more potential applications.

This approach provides the very great advantage of allowing a remote object to remain in a standby mode indefinitely, without tapping internal battery energy storage reserves, until such time it is desired to initiate communications. This essentially preserves the entirety of a remote object's internal battery storage capacity for the "shelf" lifetime of the battery.

In accordance with the principles of the present invention, a long-life or lifetime battery is permitted to be installed at the factory for devices which require communications functions, such remote identification modules and PGM weapons. This provides for the service life of the datalink activation system of up to that of the "shelf" life of the battery installed, typically on the order of 10 years for lithium batteries employed in objects such as smart munitions.

BRIEF DESCRIPTION OF THE DRAWINGS

The same elements or parts throughout the figures are designated by the same reference characters.

DETAILED DESCRIPTION OF THE PREFERRED EMBODIMENT

Figure 1:
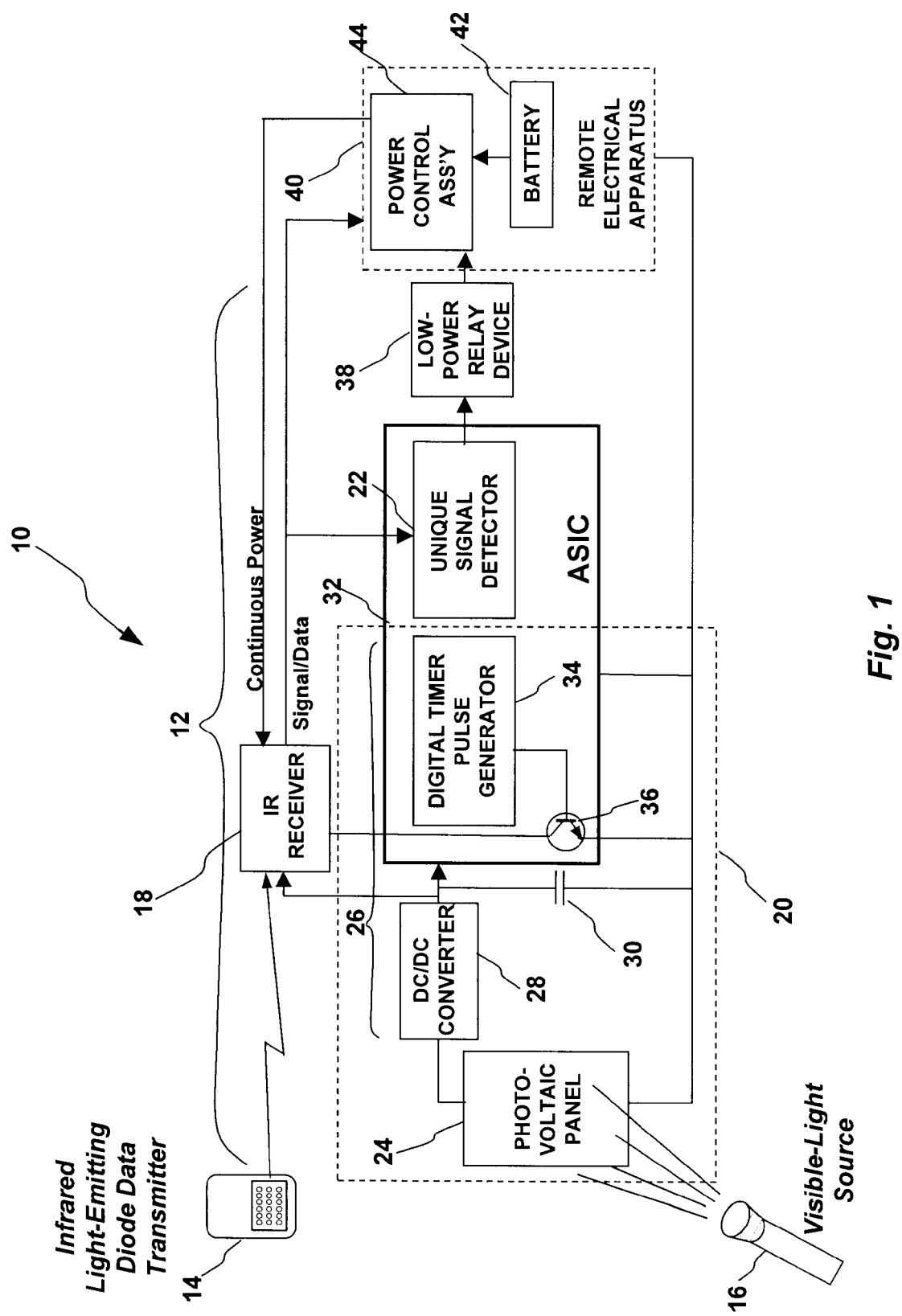
FIG. 1 is a schematic illustration of the self-powered data link activation system of the present invention.

Referring now to the drawings and the characters of references marked theron, FIG. 1 illustrates the self-powered datalink activation system of the present invention, designated generally as 10. The self-powered datalink activation system 10 includes a wireless activation system, designated generally as 12, a remote optical transmitter 14 and a remote optical emission source 16. The remote optical source 16 may typically be a directed beam optical light source provided by an incandescent flood lamp or a light bulb/parabolic reflector assembly, or a diffuse source fluorescent light or natural ambient light source. The optical energy will typically be in the visible optical spectrum.

The optical data transmitter 14 typically comprises an infrared light-emitting diode (LED) array operating with a carrier frequency compatible with a remote receiver (discussed below) of the wireless datalink activation system. The data transmitter 14 is preferably modulated with an Amplitude Shift Keyed (ASK) format in accordance with a serial data stream.

The wireless datalink activation system 12 comprises a data receiver 18, a low-power photo-voltaic power generation and distribution system 20, a unique signal detector 22, and a low-power relay device 38. The data receiver 18 receives serial digital information from the remote optical data transmitter 14. The data receiver 18 serves both activation and data/control wireless datalink functions. The data receiver 18 will typically receive the serial digital information at a wavelength of approximately 900 to 1000 nanometers and modulated with a square wave carrier, typically in the range of 40 to 500 kilohertz. The modulation will typically be in the range of up to 19.2 kilobits per second. The receiver 18 extracts and delivers, at its output, the modulated signal up to 19.2 kilobits per second.

The low-power photo-voltaic power generation and distribution system 20 includes a photo-voltaic panel 24 and power conditioning, accumulation, and distribution means 26. The photo-voltaic panel 24 receives optical power from an optical emission source 16. The panel 24 typically comprises high efficiency photo-voltaic cells sufficient to generate approximately 2–3 volts when illuminated. The electrical power generated by the panel 24 is relatively low power, in the range of approximately 0.1 to 10.0 mW.

The power conditioning, accumulation, and distribution means 26 is connected to the photo-voltaic panel 24 for accumulating power generated by the photo-voltaic panel 24 for periodically and intermittently distributing accumulated power in desired quantities. The power conditioning, accumulation, and distribution means 26 includes a micro-power DC to DC converter 28, which is connected to the photo-voltaic panel 24, and a capacitor 30, which is connected to the DC to DC converter 28. The power conditioning, accumulation, and distribution means 26 includes a micro-power timer integrated circuit which includes a digital timer pulse generator 34 and a transistor switch 36. The pulse generator 34 and switch 36 are portions of an Application Specific Integrated Circuit (ASIC) 32 which is connected in parallel to, and receives its operating power from, the capacitor 30. The function of the DC to DC converter 28 is to raise the 2–3 volts available from the photo-voltaic panel 24 up to the operating voltage level of the ASIC 32 and IR receiver 18.

The ASIC 32 comprises the digital timer pulse generator 34, the unique signal detector 22, and the transistor switch 36. The digital timer pulse generator 34 creates the duty cycles for the power accumulation and distribution phases of power conditioning (discussed later), and is connected to the transistor switch 36 which periodically dispenses power to the IR receiver 18 (during the power distribution phase). The unique signal detector 22 is continuously powered by the DC to DC converter/capacitor (28,30) power input to the ASIC 32, and is connected to the output of the IR receiver 18. The function of the unique signal detector is to evaluate the incoming signal for compliance with a pre-defined waveform.

The capacitor 30 might typically be a low leakage 100 microfarad capacitor rated at 6 volts. The DC/DC converter 28 is a micropower, high efficiency direct current power converter which operates with input voltages down to approximately two volts, and delivers a nominal output voltage of up to approximately five volts. An example of DC/DC converter 28 is a Linear Technology micropower, regulated 5V charge pump DC/DC converter, part number LTC1516.

The range of voltage swing during the power accumulation and distribution periods is governed by discrete control settings applied to the digital timer pulse generator 34, the size of the energy storage capacitor 30, the current draw of the IR receiver 18, and the voltage and current available from the photo-voltaic panel 24.

The unique signal detector 22 is connected to the IR receiver 18 and to a low power relay, or switching, device 38. Upon detection of the receipt of a signal qualifying as a key from the intermittently powered IR receiver, a command is issued to the electrical apparatus 40 to initiate uninterrupted data communications from the IR receiver 18. The low-power relay device 38 is connected between the unique signal detector 22 and the power control assembly 44 for activating the electrical apparatus 40. The characteristics of the low-power relay device 38 are such that when there is an off condition, extremely low leakage current is drawn from a battery 42 within the electrical apparatus 40. A power control assembly 44 of the electrical apparatus 40 regulates the power application function in the remote electrical apparatus 40. A low leakage switch characteristic permits the utilization of a lifetime battery 42 within the remote electrical apparatus 40 without the premature discharge of the battery 42. Another characteristic of the low-power relay device 38 is that it operates on the low currents available from the unique signal detector 22 output.

The unique signal used as the enabling key may be as simple as a continuous carrier "on", or "mark", condition interrupted by a dropout, or "space", of specified duration, or as a square wave pulse train of a specific frequency, or as a more complicated series of pulses or data.

Figure 2:
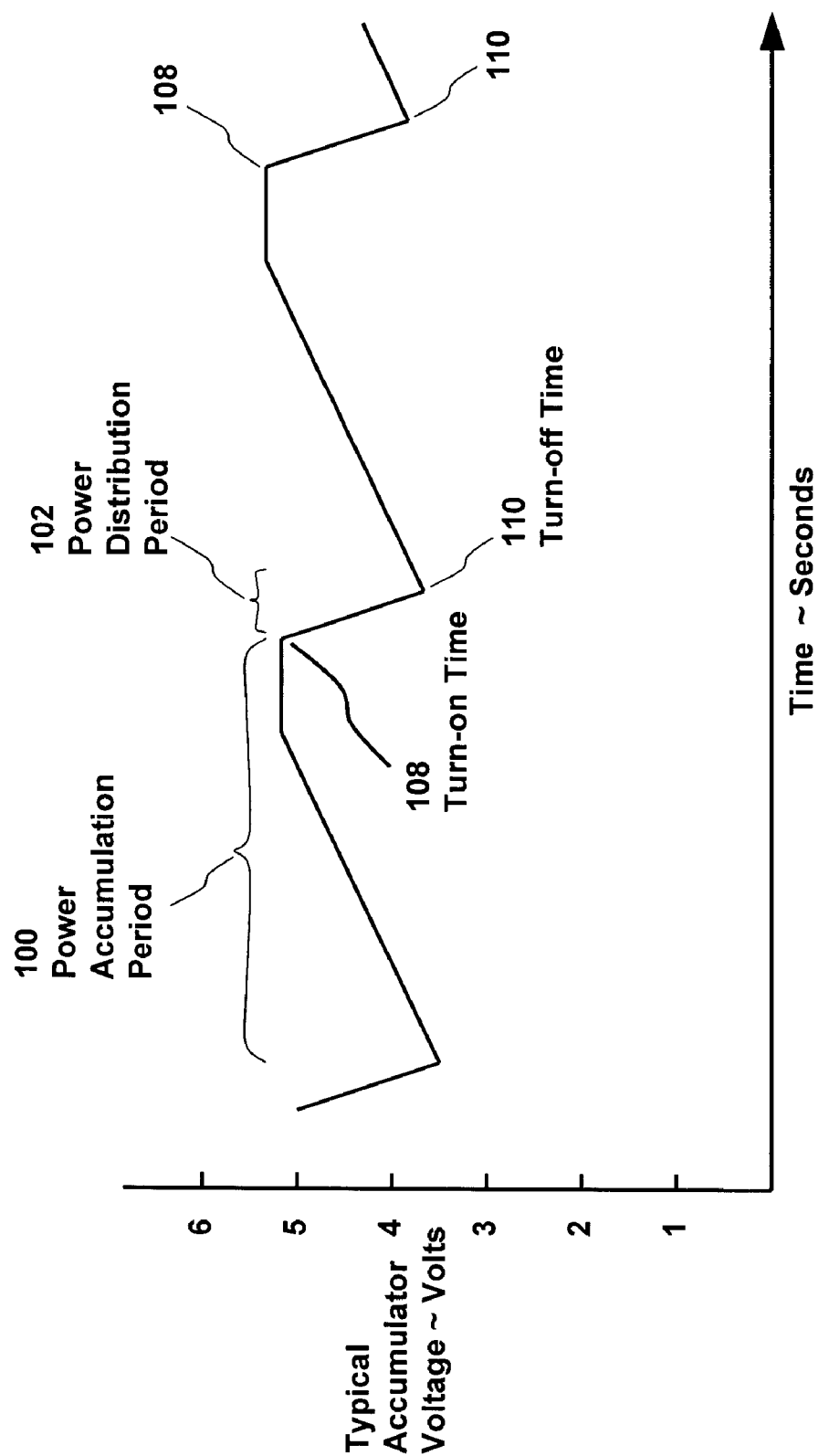
FIG. 2 is a diagram illustrating a typical voltage time history within the power conditioning, accumulation, and distribution means of the self-powered datalink activation system shown in FIG. 1.

FIG. 2 illustrates the periodic nature of the power conditioning, accumulation, and distribution phases of the self-powered datalink activation system. When power delivered from the self-powered datalink activation system photo-voltaic optical power accumulation panel 24 of FIG. 1 is insufficient to continuously power the IR receiver 18, then power is accumulated for a period 100, as shown in FIG. 2, without passing any on to the IR receiver 18. Then, after a sufficient period of time has passed to allow the capacitor 30 to charge up to a nominal 5 volts under the anticipated optical illumination conditions, power is released for a short period 102 sufficient to determine if a unique signal is present from the unique signal detector. This process is repeated indefinitely until a qualifying activation signal is detected. At that time power from the power control assembly 44 is continuously applied to the IR receiver 18 by locking transistor switch 36 into the "on" condition and supplying sufficient supplementary power from the battery 42 to augment that being supplied by the DC to DC converter 28.

Although the present invention has been discussed above with respect to some mobile and stationary remote objects as examples, other applications may also be included. Such an application may include any situation where it is necessary to establish communications with a self-powered remote object which does not have convenient continual access to an external power source and for which periodic replacement of a datalink battery would be undesirable. Mobile robotic devices meet such criteria, especially those operating in locations difficult or undesirable to access.

Difficult or undesirable to access locations could include space borne applications where the remote device may be in the vacuum of space for extended periods of time. yet near enough (tens to hundreds of feet) to a controlling manned or unmanned space vehicle for datalink operation.

Other undesirable-to-access applications, which also clearly benefit from this invention include remote controlled robotics operating in hazardous materials, radioactive, or clean room environments.

Obviously, many modifications and variations of the present invention are possible in light of the above teachings. For example, the IR data transmitter 14 and receiver 18 may be substituted with RF components providing equivalent functionality. It is therefore to be understood that, within the scope of the appended claims, the invention may be practiced otherwise than as specifically described. What is claimed and desired to be secured by Letters Patent of the United States is:

What is claimed is:

1. A wireless datalink activation system for remote activation of an electrical apparatus using a remote optical data transmitter and a remote optical emission source, said wireless datalink activation system comprising:

a) at least one data receiver for receiving serial digital information from a remote optical data transmitter, said data receiver serving both activation and data/control wireless datalink functions;

b) a low-power photo-voltaic power generation and distribution system, comprising:

i) at least one photo-voltaic panel for receiving optical power from a remote optical emission source; and ii) power conditioning, accumulation, and distribution means, comprising a digital micro-power timer integrated circuit, said power conditioning, accumulation, and distribution means being connected to said at least one photo-voltaic panel for accumulating power generated by said at least one photo-voltaic panel for periodically and intermittently distributing accumulated power in desired quantities; and c) a unique signal detector connected to said at least one data receiver and to said power conditioning, accumulation and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

2. The wireless datalink activation system of claim 1, wherein said power conditioning, accumulation, and distribution means further comprises a micro-power DC to DC converter connected to said at least one photo-voltaic panel for conditioning and accumulating power generated by said photo-voltaic panel.

3. The wireless datalink activation system of claim 2, wherein said power conditioning, accumulation, and releasing means further comprises:
   a capacitor connected to said photo-voltaic panel.

4. The wireless datalink activation system of claim 1, wherein said digital micropower timer integrated circuit and said unique signal detector comprise an application specific integrated circuit (ASIC).

5. The wireless datalink activation system of claim 4, wherein said ASIC further comprises:
   a transistor switch connected to an output of said digital micro-power timer integrated circuit and to said data receiver connected to said unique signal detector for activating said evaluation of incoming data.

6. The wireless datalink activation system of claim 5, further comprising a low power relay device connected between said unique signal detector and said electrical apparatus for activating said electrical apparatus.

7. The wireless datalink activation system of claim 1, wherein said unique signal detector comprises a tone detector circuit.

8. The wireless datalink activation system of claim 1, further including said electrical apparatus comprising smart munitions positioned in a pre-launch configuration.

9. The wireless datalink activation system of claim 8, wherein said pre-launch configuration comprises a weapons bay.

10. The wireless datalink activation system of claim 8, wherein said pre-launch configuration comprises a launch canister.

11. The wireless datalink activation system of claim 8, wherein said pre-launch configuration comprises a weapon loading conveyer assembly for breach-loaded munitions.

12. The wireless datalink activation system of claim 8, wherein said optical power received by said at least one photo-voltaic panel comprises relatively low electrical power in a range of 0.1 mW–10.0 mW.

13. The wireless datalink activation system of claim 8, wherein said at least one data receiver comprises two data receivers.

14. A self-powered datalink activation system for remote activation of an electrical apparatus, comprising:
   a) a remote optical data transmitter;
   b) a remote optical emission source; and
   c) a wireless datalink activation system, comprising:
      i) at least one data receiver for receiving serial digital information from said remote optical data transmitter, said data receiver serving both activation and data/control wireless datalink functions;
      ii) a low-power photo-voltaic power generation and distribution system, comprising;
         at least one photo-voltaic panel for receiving optical power from a remote optical emission source; and
         power conditioning, accumulation, and distribution means, comprising a digital micro-power timer integrated circuit, said power conditioning, accumulation, and distribution means being connected to said at least one photo-voltaic panel for accumulating power generated by said at least one photo-voltaic panel for periodically and intermittently distributing accumulated power in desired quantities; and
      iii) a unique signal detector connected to said at least one data receiver and to said power conditioning, accumulation, and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

15. The self-powered datalink activation system of claim 14, wherein said power conditioning, accumulation, and distribution means further comprises a micro-power DC to DC converter connected to said at least one photo-voltaic panel for conditioning and accumulating power generated by said photo-voltaic panel.

16. The self-powered datalink activation system of claim 15, wherein said power conditioning, accumulation, and releasing means further comprises:
   a capacitor connected to said photo-voltaic panel.

17. The self-powered datalink activation system of claim 15, wherein said optical power received by said at least one photo-voltaic panel comprises relatively low electrical power in a range of 0.1 mW–10.0 mW.

18. The self-powered datalink activation system of claim 14, wherein said digital micro-power timer integrated circuit and said unique signal detector comprise an application specific integrated circuit (ASIC).

19. The self-powered datalink activation system of claim 18, wherein said ASIC (-=, further comprises:
   a transistor switch connected to an output of said digital micropower timer integrated circuit and to said data receiver connected to said unique signal detector for activating said evaluation of incoming data.

20. A wireless datalink activation system for remote activation of smart munitions positioned in a pre-launch configuration, said wireless datalink activation using a remote optical data transmitter and a remote optical emission source, said wireless datalink activation system comprising:
   a) at least one data receiver for receiving serial digital information from a remote optical data transmitter, said data receiver serving both activation and data/control wireless datalink functions;
   b) a low-power photo-voltaic power generation and distribution system, comprising:
      at least one photo-voltaic panel for receiving optical power from a remote optical emission source; and
      power conditioning, accumulation and distribution means, comprising a micro-power timer integrated circuit, said power conditioning, accumulation, and distribution means being connected to said at least one photo-voltaic panel for accumulating power generated by said at least one photo-voltaic panel for periodically and intermittently distributing accumulated power in desired quantities; and
   c) a unique signal detector connected to said at least one data receiver and to said power accumulation and distribution means, and being connectable to smart munitions positioned in a pre-launch configuration, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

21. The wireless datalink activation system of claim 20, wherein said power conditioning, accumulation, and distribution means further comprises a micro-power DC to DC converter connected to said at least one photo-voltaic panel for conditioning and accumulating power generated by said photo-voltaic panel.

22. The wireless datalink activation system of claim 21, wherein said power conditioning, accumulation, and releasing means further comprises: a capacitor connected to said photo-voltaic panel.

23. The wireless datalink activation system of claim 20, wherein said digital micro-power timer integrated circuit and said unique signal detector comprise an application specific integrated circuit (ASIC).

24. The wireless datalink activation system of claim 23, wherein said ASIC further comprises:
 a transistor switch connected to an output of said digital micro-power timer integrated circuit and to said data receiver connected to said unique signal detector for activating said evaluation of incoming data.

25. The wireless datalink activation system of claim 20, wherein said optical power received by said at least one photo-voltaic panel comprises relatively low electrical power in a range of 0.1 mW–10.0 mW.

26. A wireless datalink activation system for remote activation of an electrical apparatus using a remote optical data transmitter and a remote optical emission source, said wireless datalink activation system comprising:
 a) at least one data receiver for receiving serial digital information from a remote optical data transmitter, said data receiver serving both activation and data/control wireless datalink functions;
 b) a low-power photo-voltaic power generation and distribution system, comprising:
  at least one photo-voltaic panel for receiving optical power from a remote optical emission source; and
  power conditioning, accumulation, and distribution means connected to said at least one photo-voltaic panel for accumulating power generated by said at least one photo-voltaic panel for periodically and intermittently distributing accumulated power in desired quantities, said power conditioning, accumulation and distribution means, comprising:
   i) a micro-power DC to DC converter;
   ii) a capacitor connected to an output of said DC to DC converter; and
   iii) a digital micro-power timer integrated circuit connected to said DC to DC converter and to said capacitor; and
 c) a unique signal detector connected to said at least one data receiver and to said power conditioning, accumulation, and distribution means, and being connectable to an electrical apparatus, wherein said periodically and intermittently distributed power enables said unique signal detector to evaluate incoming data received from said at least one data receiver, and upon detection of the receipt of a signal qualifying as a key, thereupon issues a command to said electrical apparatus to initiate uninterrupted data communication from said data receiver.

* * * * *